US008115770B2

(12) United States Patent
Sinclair-McGarvie et al.

(10) Patent No.: US 8,115,770 B2
(45) Date of Patent: Feb. 14, 2012

(54) PINCER PARAMETRIC INTERSECTOR

(75) Inventors: Mark L. Sinclair-McGarvie, Cambridge (GB); Christopher C. Brown, Cambridge (GB); Michael J. Atkins, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1223 days.

(21) Appl. No.: 11/836,324

(22) Filed: Aug. 9, 2007

(65) Prior Publication Data

US 2008/0036768 A1 Feb. 14, 2008

Related U.S. Application Data

(60) Provisional application No. 60/836,618, filed on Aug. 9, 2006.

(51) Int. Cl.
*G06T 11/20* (2006.01)
(52) U.S. Cl. ........................................ 345/442; 345/441
(58) Field of Classification Search .................... 345/442
See application file for complete search history.

(56) References Cited

U.S. PATENT DOCUMENTS 4,890,242 A * 12/1989 Sinha et al. .................... 345/419

OTHER PUBLICATIONS

Limaiem et al. "Geometric algorithms for the intersection of curves and surfaces", Computer & Graphics, vol. 12 No. 3, pp. 391-403, 1995.*
Sederberg et al. "Comparison of three curve intersection algorithms", Computer-Aided Design, vol. 18 issue 1 Jan.-Feb. 1986, pp. 58-63, 1986.*
Hu et al. "Robust interval algorithm for curve intersections", Computer-Aided Design, vol. 28 No. 6/7, pp. 495-506, 1996.*

* cited by examiner

*Primary Examiner* — Michelle K Lay

(57) ABSTRACT

A system, method, and computer program for a finding an intersection for geometrically coincident curves, comprising selecting a curve pair where at least one curve in said curve pair is a parametric curve; determining a curve parameter for each curve in said curve pair; splitting each of said curves into a plurality of candidate segments; recursively subdividing each of said candidate segments into a pair of finalized segments that are sufficiently straight; intersecting an approximation for each of said finalized segments; obtaining a plurality of next parameter values from said intersecting step; and testing for a terminating condition and appropriate means and computer-readable instructions.

5 Claims, 11 Drawing Sheets 2 curves, 1 Intersection 2 curves, 2 Intersections 2 curves, 0 Intersections 1 curve, 1 intersection
(Self-intersecting)

PINCER PARAMETRIC INTERSECTOR

PRIORITY OF APPLICATION

The present application claims priority of U.S. Provisional Application, Ser. No. 60/836,618 filed Aug. 9, 2006, which is incorporated herein by reference.

TECHNICAL FIELD

The presently preferred embodiment of the innovations described herein relate generally to parametric curves. More specifically, the presently preferred embodiment relates to identifying all of the discrete intersections between two planar curves.

BACKGROUND

An intersection between two curves may be defined to be any contiguous region in which they are geometrically coincident. An intersection between a curve and itself (i.e., a self-intersection) may be defined to be any contiguous region where sections of the curve at different parameter values are geometrically coincident. Furthermore, intersections may be split into two main categories: discrete and continuous intersections. A discrete intersection lies at a single geometrical point in Cartesian space, and two points in parameter space. A continuous intersection on the other hand (also known as an overlap intersection) can occupy two distinct continuous regions in parameter space and usually a continuous region in Cartesian space also. Both discrete and continuous intersections may be classified as crossing, tangent, or endpoint-touch intersections. The finding of intersections between curves (and between a curve and itself) is an important operation in geometry management. It is used in such areas as local and global trimming, Boolean operations, and self-intersection detection, all of which are core geometry management functions. It is thus desirable that detection of intersections is accurate, reliable and economical in terms of time and memory.

A current method for finding generic intersections employed by geometry managers is essentially a rootfinding approach where the problem is expressed in terms of a distance function of which the zeroes are to be found in several evaluations. Each evaluation of the distance function itself requires a Newton-Raphson relaxation, as the problem of closest approach has also been expressed internally in terms of finding the zeroes of a suitable function. Thus, the overall relaxation to each root is a "Newton-Raphson-squared" process whereby a Newton-Raphson solve is performed at each step of an "owning" Newton-Raphson solve. Several drawbacks have been identified using the current method described above. First, there is a loss of context when rootfinding where the rootfinder only has access to a protocol interface that it uses to evaluate function values and derivatives. While this does make the rootfinder completely generic and able to attempt a solution of any 1d rootfinding problem, it makes it impossible to adapt the method to deal with specific problems. A particular issue rootfinding near cusps, where the derivatives on each curve are small: both Newton-Raphson and Brent are unreliable in this area. Second is complexity, in that the totality of routines for finding generic intersections are widely dispersed throughout the code: around 20 files are used in the core routines of the splitter, the distance function definition, the cigars, closest-approach and rootfinding. This makes understanding and debugging difficult, and has further implications when modifying the code. Third is unreliability, in that intersection-finding is poor near to offset cusps, and intersections can also fail to be found in non-cusp models. Even when intersections are found successfully, many warnings may be output as the intersector tries to converge to "ghost" roots, either on virtual extensions or otherwise. Fourth is no tangent-finding, in that the current generic intersector will not find tangent intersections. This is a fundamental limitation of the method of looking for sign changes in the distance function, as there is no sign change at a tangency. Fifth is speed, in that one Newton-Raphson loop is used within another during relaxation has implications for speed and memory usage. And lastly is asymmetry, in that the problem of intersection-finding is a-priori symmetrical: no curve is more important in any sense than the other. However, the method used to find intersections introduces asymmetry as it treats each curve differently. This can cause problems if the curve order changes: different numbers of intersections may be found, or the intersections found may be at slightly different locations. This has consequences for the calling routines-ideally any calling routine should be able to rely on the results of intersecting curve A with curve B being the same as the results of intersecting curve B with curve A.

What is needed is a new intersector that resolves the drawbacks of the above.

SUMMARY

To achieve the foregoing, and in accordance with the purpose of the presently preferred embodiment as broadly described herein, the present application provides a method to find an intersection for geometrically coincident curves, comprising selecting a curve pair where at least one curve in said curve pair is a parametric curve; determining a curve parameter for each curve in said curve pair; splitting each of said curves into a plurality of candidate segments; recursively subdividing each of said candidate segments into a pair of finalized segments that are sufficiently straight; intersecting an approximation for each of said finalized segments; obtaining a plurality of next parameter values from said intersecting step; and testing for a terminating condition. The method, wherein at least one curve of said curve pairs is analytic. The method, wherein said candidate segments has a low turn angle that is not more than five (5) degrees. The method, wherein calculating said tangents occurs by approximation. The method, wherein calculating said tangent occurs by a Taylor approximation.

Another advantage of the presently preferred embodiment is to provide a method to find an intersection for geometrically coincident curves, comprising determining a rectangular box corresponding to a finalized segment having a set of current parameters, wherein said rectangular box completely contains said finalized segment; calculating a plurality of tangents from said set of current parameters; recording a plurality of parameter values to said current parameters that corresponds to an intersection of said calculated tangents; and testing for a terminating condition. The method, wherein calculating of said plurality of tangents occurs utilizing n-order Taylor series approximations.

And another advantage of the presently preferred embodiment is to provide a method to determine an intersection of two curves, comprising having a first curve with a set of parameter values, and a second curve with a set of parameter values; intersecting two tangents determined from said two sets of parameter values that result in a next pair of parameter values; and solving for a discrete intersection of said curves at a rate of convergence.

Yet another advantage of the presently preferred embodiment is to provide a computer-program product tangibly embodied in a machine readable medium to perform a method to find an intersection for geometrically coincident curves, comprising instructions for selecting a curve pair where at least one curve in said curve pair is a parametric curve; determining a curve parameter for each curve in said curve pair; splitting each of said curves into a plurality of candidate segments; recursively subdividing each of said candidate segments into a pair of finalized segments that are sufficiently straight; intersecting an approximation for each of said finalized segments; obtaining a plurality of next parameter values from said intersecting step; and testing for a terminating condition. The computer-program product, wherein at least one curve of said curve pairs is analytic. The computer-program product, wherein said candidate segments has a low turn angle that is not more than five (5) degrees. The computer-program product, wherein calculating said tangents occurs by approximation. The computer-program product, wherein calculating said tangent occurs by a Taylor approximation.

Still another advantage of the presently preferred embodiment is to provide a system comprising a first parametric curve with a parameter value; a second curve with a parameter value; a tangent intersection of said first parametric curve and second curve based on said respective parameter values that derives a next parameter value for said first parametric curve and a next parameter value for said second curve in an iterative manner; and a curve intersection of said first parametric curve and said second curve within a desired accuracy.

And still another advantage of the presently preferred embodiment is to provide a data processing system having at least a processor and accessible memory to implement a method to determine an intersection of two curves, comprising means for having a first curve with a set of parameter values, and a second curve with a set of parameter values; means for intersecting two tangents determined from said two sets of parameter values that result in a next pair of parameter values; and means for solving for a discrete intersection of said curves at a rate of convergence.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 11:
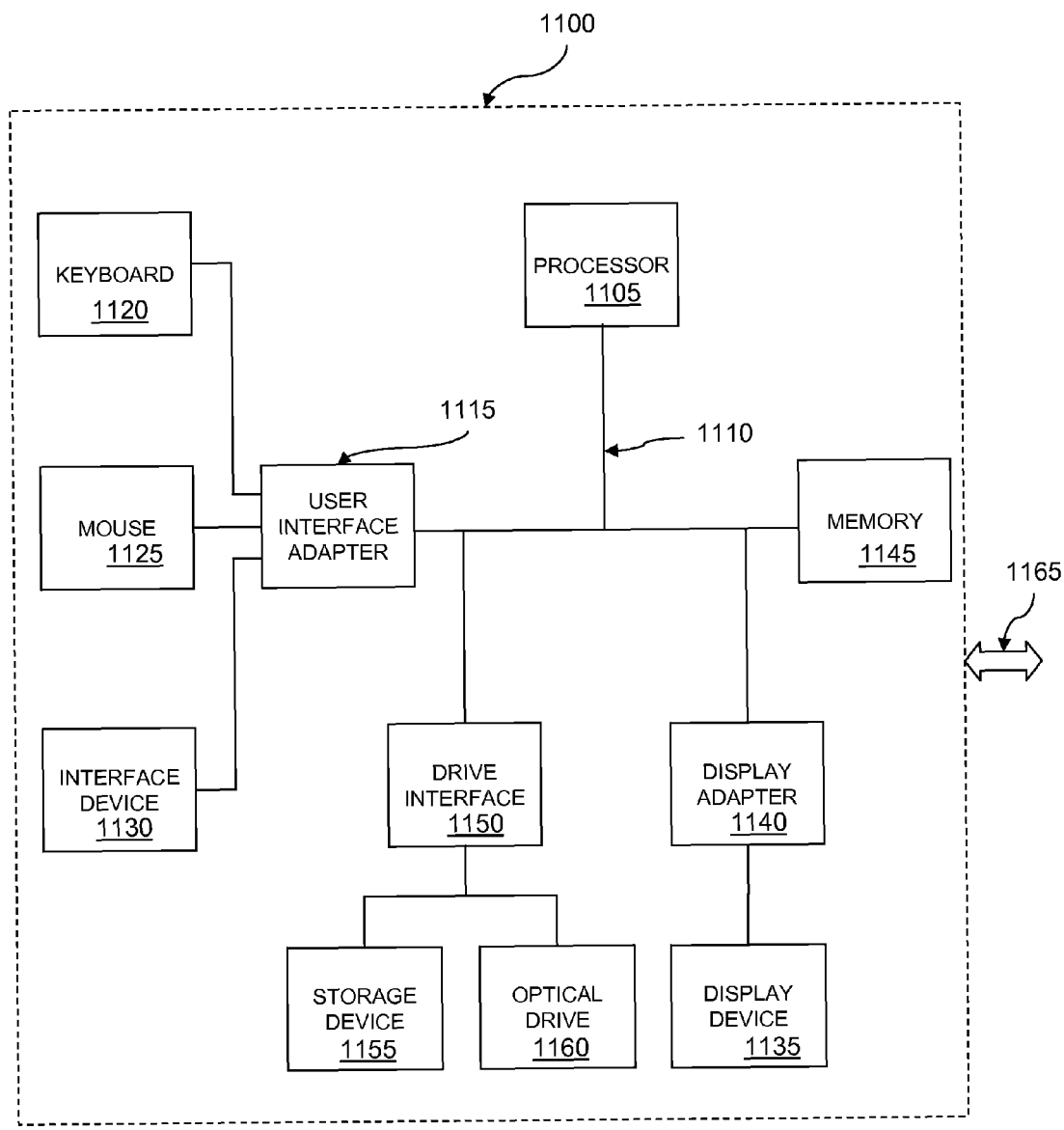
FIG. 11 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method for a pincer parametric intersector. FIG. 11 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Now therefore, in accordance with the presently preferred embodiment, an operating system executes on a computer, such as a general-purpose personal computer. Referring to FIG. 11, an exemplary system for implementing the presently preferred embodiment includes a general-purpose computing device in the form of a computer 1100, such as a desktop or laptop computer, including a plurality of related peripheral devices (not depicted). The computer 1100 includes a microprocessor 1105 and a bus 1110 employed to connect and enable communication between the microprocessor 1105 and a plurality of components of the computer 1100 in accordance with known techniques. The bus 1110 may be any of several types of bus structures including a memory bus or memory controller, a peripheral bus, and a local bus using any of a variety of bus architectures. The computer 1100 typically includes a user interface adapter 1115, which connects the microprocessor 1105 via the bus 1110 to one or more interface devices, such as a keyboard 1120, mouse 1125, and/or other interface devices 1130, which can be any user interface device, such as a touch sensitive screen, digitized pen entry pad, etc. The bus 1110 also connects a display device 1135, such as an LCD screen or monitor, to the microprocessor 1105 via a display adapter 1140. The bus 1110 also connects the microprocessor 1105 to a memory 1145, which can include ROM, RAM, etc.

The computer 1100 further includes a drive interface 1150 that couples at least one storage device 1155 and/or at least one optical drive 1160 to the bus. The storage device 1155 can include a hard disk drive, not shown, for reading and writing to a disk, a magnetic disk drive, not shown, for reading from or writing to a removable magnetic disk drive. Likewise the optical drive 1160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 1100.

The computer 1100 can communicate via a communications channel 1165 with other computers or networks of computers. The computer 1100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 1145 of the computer 1100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Process

Figure 1A:
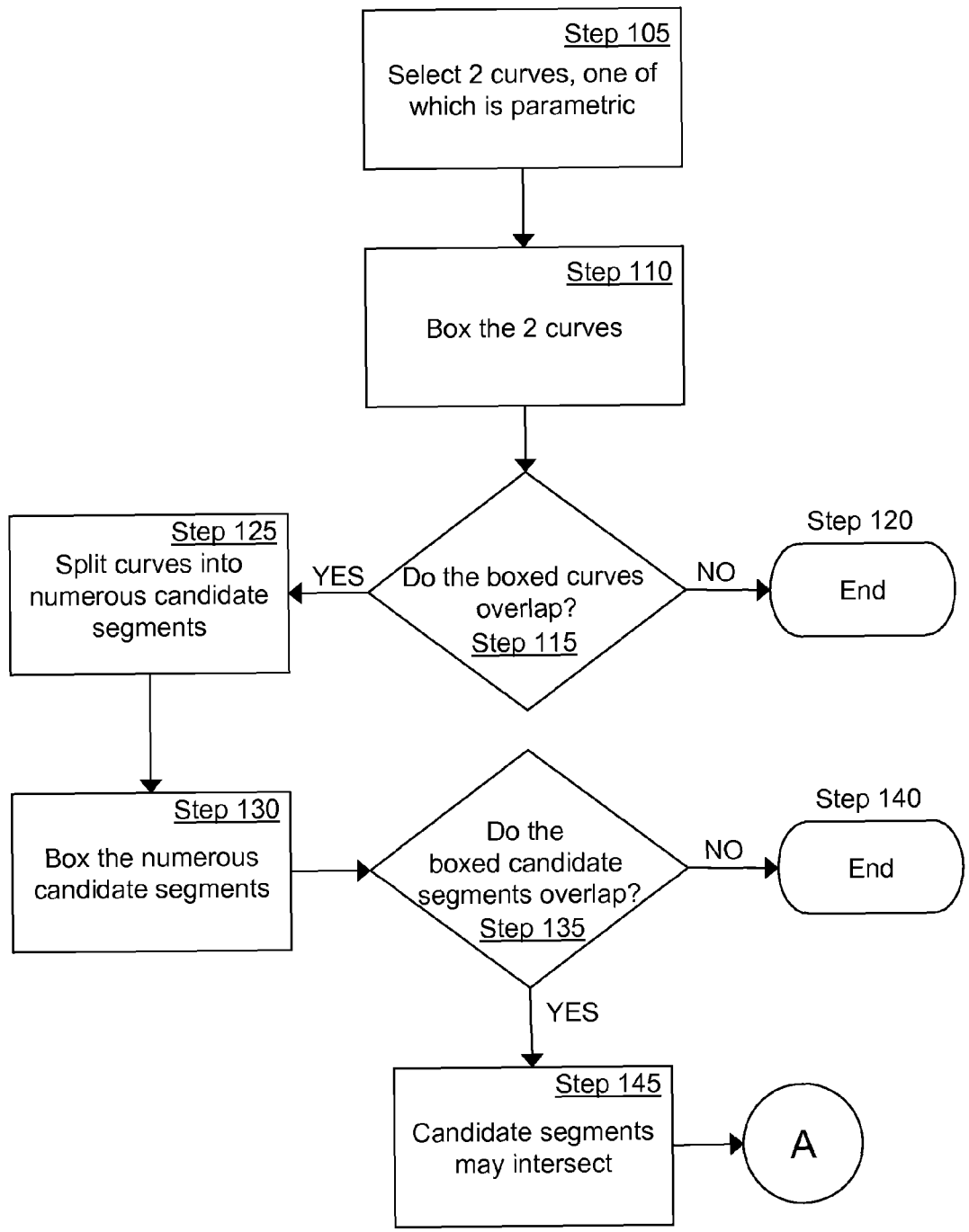
FIG. 1 is a representation of sample curves having intersections.

FIG. 1 depicts a flowchart of a process in accordance with a disclosed embodiment. Referring to FIG. 1 for finding an intersection between two curves, generally illustrated at 100. The process begins with selecting two curves, where one of those curves is parametric (Step 105). Next, box the two selected curves by determining two rectangular boxes that completely contain each curve, respectively (Step 110). Next, determine whether the two boxed curves overlap (Step 115), and if they do not then the curves are non-intersecting and the routine terminates (Step 120). If the two boxes do overlap, then split the curves into numerous candidate segments (Step 125). In the presently preferred embodiment the candidate segments are selected based on the turn angle with a lower turn angle yielding more boxed candidate segments. Next, box the numerous candidate segments by determining rectangular boxes that completely contain each the chords for each of the candidate segments (Step 130). Next determine whether two boxed candidate segment's boxes, one from each curve, overlap (by coexisting at a point in Cartesian space) where the candidate segment's boxes from one curve are compared with the candidate segment's boxes of the other curve (Step 135), and if they do not overlap then the candidate segments themselves do not intersect (Step 140). If the two candidate segment's boxes do overlap, then the two candidate segments may intersect (Step 145) and pass those candidate segments' boxes to a recursive subdivision routine for further candidate refinement (Step 150).

Figure 1B:
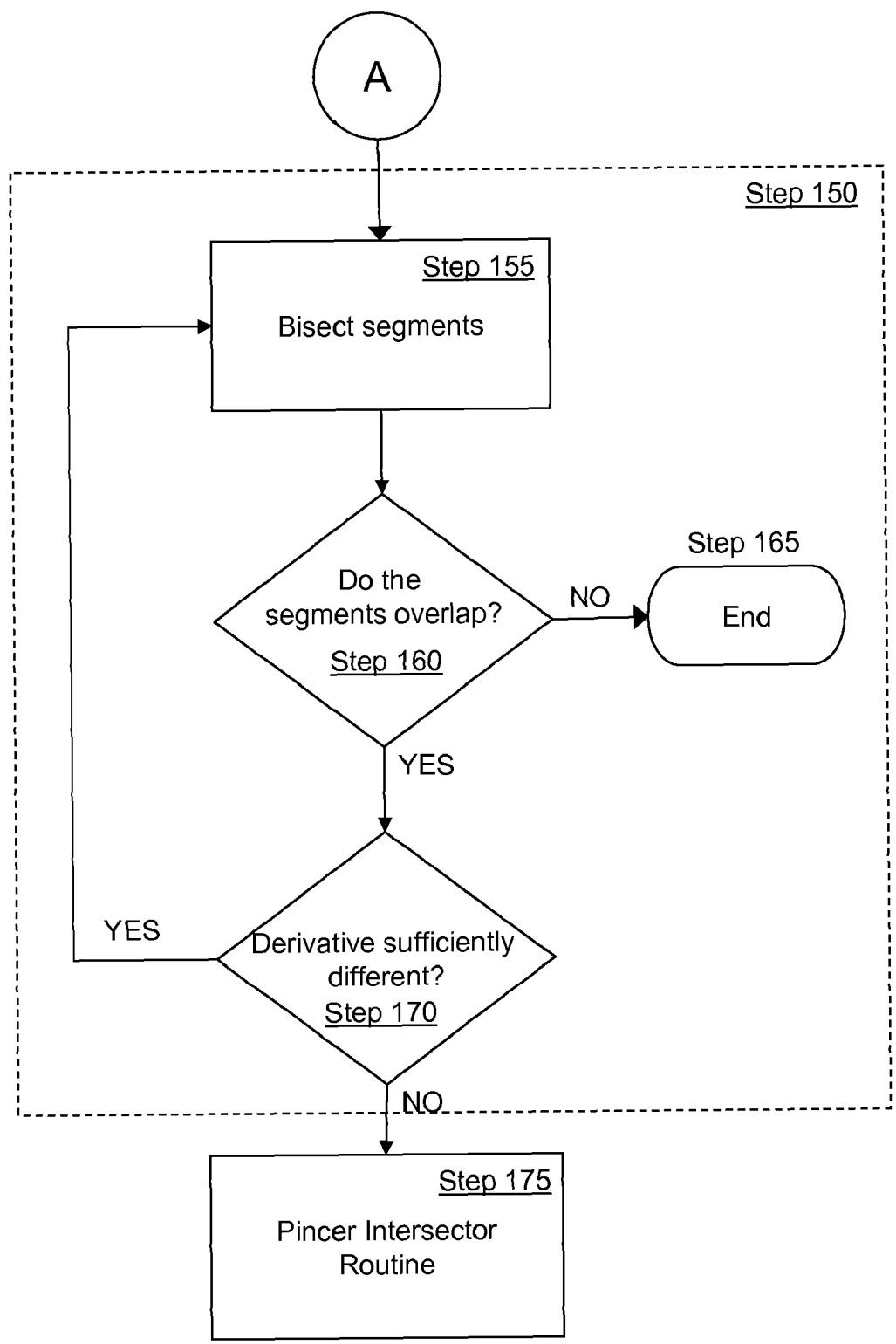

Continuing with FIG. 1*b*, in the recursive subdivision routine (Step 150), bisect each of the candidate segments resulting in two refined candidate segment's boxes from each candidate segment's boxes for a total four refined candidate segments (Step 155). From the respective curves, determine whether each of the refined candidate segment's boxes overlap (Step 160) and terminate as non-intersecting if they do not (Step 165). If two of the refined candidate segment's boxes do overlap, then turning to one of the overlapping refined candidate segment's boxes having a refined candidate segment, check whether a derivative at a refined candidate segment first end is "sufficiently straight," meaning five degrees or less in the presently preferred embodiment, from a derivative direction at a refined candidate segment second end (Step 170). If the derivative differences are greater than five degrees, then bisect that one refined candidate segment (Step 155) until "sufficiently straight." If the derivative differences are five degrees or less, then the refined candidate segments is sufficiently straight and may intersect a refined curve segment from the other curve that also proceeds through the recursive subdivision routine until sufficiently straight. These two finalized segments that are both sufficiently straight are together passed, along with the respective derivative information at the finalized segment ends, to a pincer intersector routine to find an intersection between the two finalized segments (Step 175).

Figure 2:
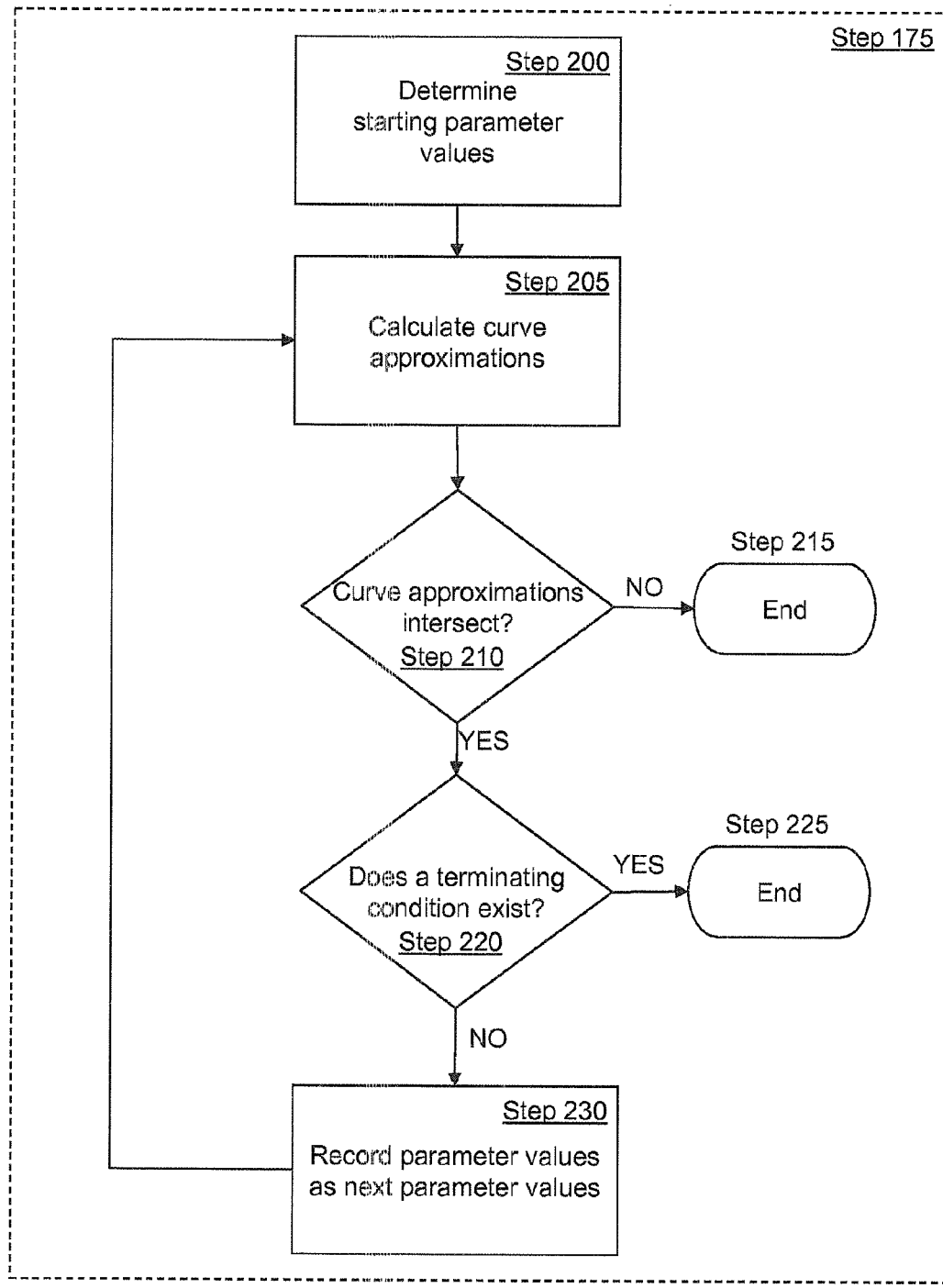
FIG. 2 is an illustration of the presently preferred embodiment described herein.

FIG. 2 depicts a flowchart of a pincer process in accordance with a disclosed embodiment. Referring further to FIG. 2, given the two finalized segments, the starting parameter values must be determined (Step 200). One method to select the starting parameter values is to choose the start of each candidate segment. An alternate method is to choose the middle of each segment. An alternate method is to utilize the respective derivative information at the finalized segment ends obtained in Step 160. This derivative information can be used to construct "morphed" bounded straight line curves that geometrically correspond to the chords of each finalized segment but have a parameterization that matches closely to the original curves, where "morphed" means "geometrically straight chordal lines." Put another way, given a segment running from t=0 to t=1, defined by:

$$x=x(t) \tag{Eq. 1}$$

a line with parameterization is constructed by:

$$x=l(t)=b+f(t)*d, \text{ where} \tag{Eq. 2}$$

b=the line base point, d=the line direction, and f(t) is a linear or quadratic function of t. (*=cross-product)

Such that, b and d are chosen so that the line passes through x(0) and x(1) and f(t) is chosen so that l(t) is preferably close to x(t) for any given t between 0 and 1. This choice occurs by choosing an f(t) so that l'(t) and possibly l''(t) match the derivative information passed from the finalized segment. Also, if the intersection occurs towards the first end of the finalized segment, use the derivative information at the first end of the finalized segment where t=0. And if the intersection occurs towards the second end of the finalized segment, use the derivative information at the second end of the finalized segment where t=1. If only the first derivative information is available, then try to match l'(t) and f(t) to a linear function. If both the first and second derivative information is available, then match l'(t) and l''(t) such that f(t) is a quadratic function of t. The two finalized segments will be in the form of Eq. 2, and finding the start parameter values on the lines that correspond to an intersection is trivial—corresponding to at worst solving two quadratic equations.

Continuing with the presently preferred embodiment, calculate first-order Taylor approximations for each finalized segment at the start parameter values (Step 205) except (1) if the first derivative on the finalized segment is sufficiently small such that the first order Taylor approximation will quickly diverge from the finalized segment, then use a second-order Taylor Approximation, or (2) if the use of two first-order Taylor Approximations would result in two parallel lines, then second-order Taylor Approximations are used. Next, the Taylor Approximations, which can be first-order or second-order, depending, are intersected (or the Taylor Approximation of one of the finalized segments, and the analytic curve is intersected if one of the finalized segments is an analytic) (Step 210), and if they intersect, then the parameter values of the intersection are recorded. If the Taylor Approximations do not intersect, then the finalized segments are determined to not intersect, and the process terminates (Step 215). The pincer process is iterative until a terminating condition occurs (Step 220) that can be one of: (1) if two points (one on each finalized segment), call them $t_n$ and $s_n$, are within a desired linear accuracy, e.g., 0.000000000000001, to each other; (2) if the process has not moved appreciably from $t_{n-1}$ & $s_{n-1}$, but $t_n$ & $s_n$ are within a desired linear accuracy to each other, then terminate with an indication that a solution was found; (3) if the process has not moved appreciably from $t_{n-1}$ and $s_{n-1}$, or the distance between $t_n$ and $s_n$ has increased, and the two points are farther than the desired linear accuracy apart then terminate with an indication that the two curves do not intersect; and (4) if the process has gone through an arbitrary limit of iterations, e.g., 40, then terminate with an indication of a failure and output a warning (Step 225). The recorded parameter values are now the next parameter values (Step 230), where two finalized segments are parameterized by $t \rightarrow f(t)$ and $s \rightarrow g(s)$, and the start parameter values are given by $t_1$ and $s_1$, and the next parameter values are given by $t_2$ and $s_2$, according to the formulae:

$$t_2 = ((f(t_1) - g(s_1)) * g'(s_1)) / (g'(t_1) * f'(s_1)), \text{ and}$$

$$s_2 = ((s(t_1) - g(s_1)) * f'(s_1)) / (g'(t_1) * f'(s_1))$$

where * denotes the cross product of two vectors. If either parameter value crosses a finalized segment bound, then the next parameter will be held at the finalized segment bound. The pincer process then continues with Step 205 to calculate a next set of Taylor Approximations.

Operation

Figure 3:
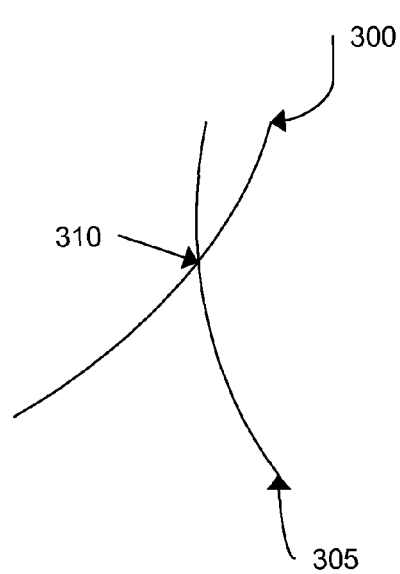
FIG. 3 is a representation of sample curves having potential intersections in Cartesian space.
Figure 3:
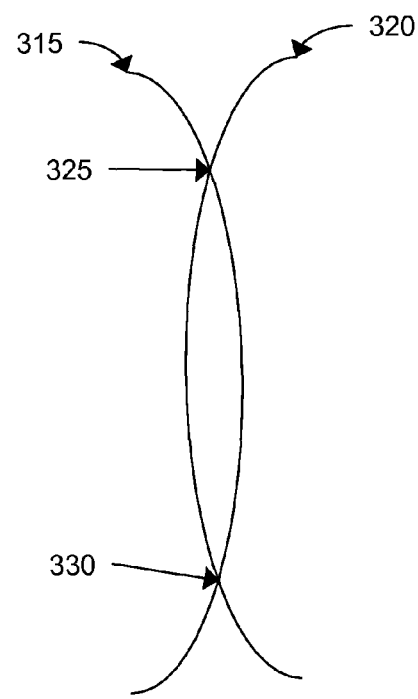
Figure 3:
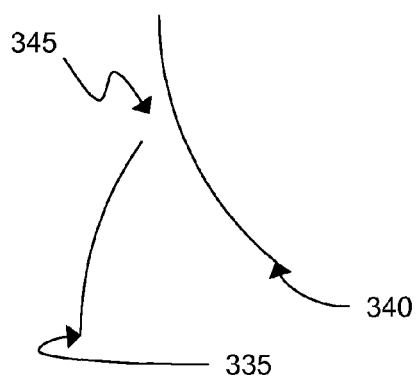
Figure 3:
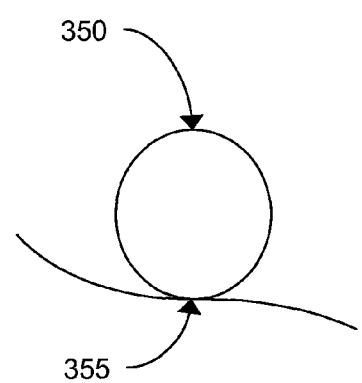

FIG. 3 is a representation of sample curves having potential intersections in Cartesian space. Referring further to FIG. 3, a first curve 300 intersects with a second curve 305 at a first intersection point 310. Also a first curve 315 can intersect a second curve 320 at not only a first intersection point 325, but also a second intersection point 330. Likewise, a first curve 335 and a second curve 340 may not interest at all, generally shown at 345. Or a first curve 350 might intersect with itself at a self intersection point 355.

Figure 4:
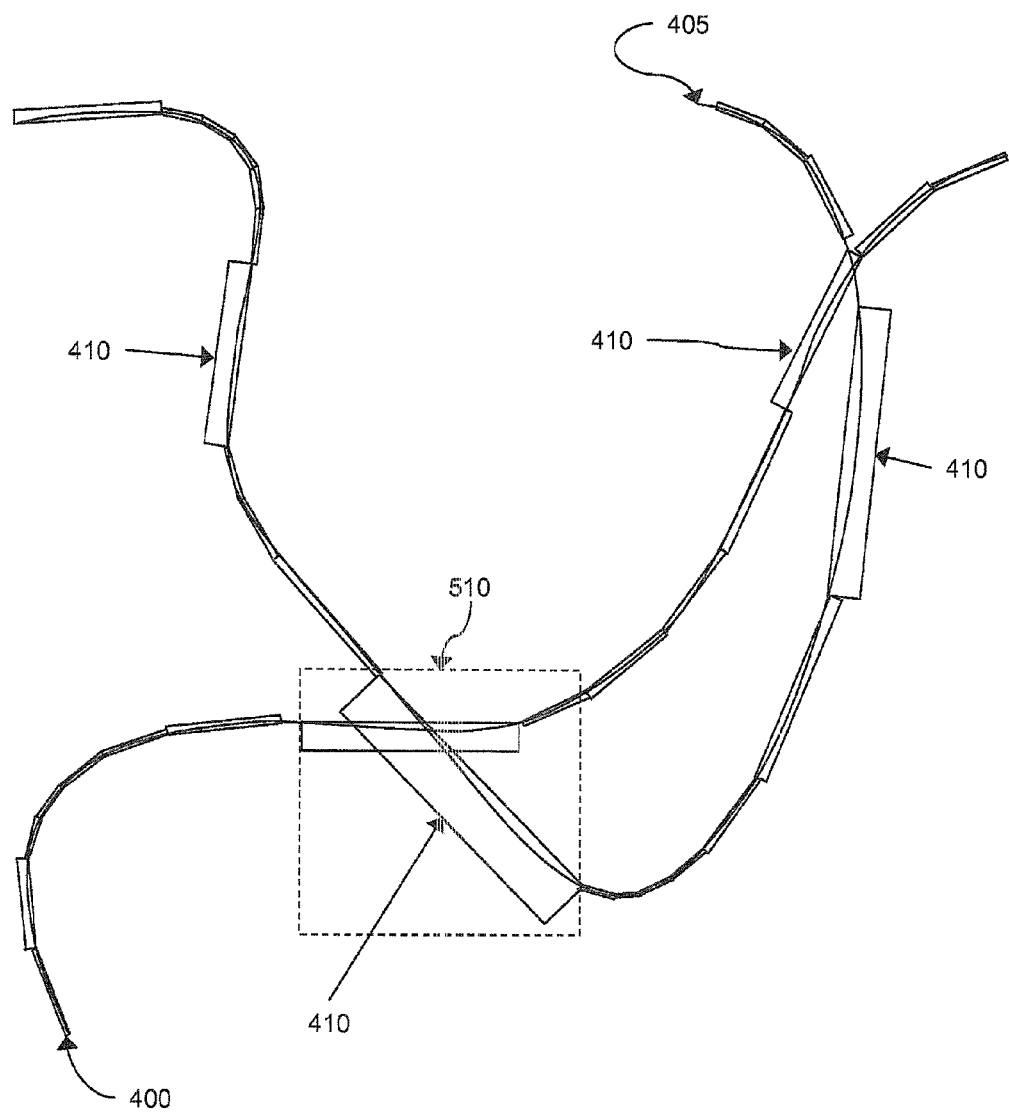
FIG. 4 is an illustration of two parent curves, where at least one of them is a parametric curve.

FIG. 4 is an illustration of two parent curves, where at least one of them is a parametric curve. Referring to FIG. 4, in an embodiment a first curve 400 and a second curve 405, i.e., parent curves, are selected (Step 105) and boxed such that two rectangular boxes are determined that completely contain each curve (not depicted here). If these boxes are found to not intersect, then we can immediately reject the curves as non-intersecting (Step 120). Otherwise, the first curve 400 and the second curve 405 are split into a number of candidate segments examples (Step 125). These segments are then boxed in a similar manner (Step 130) to the way in which the parent curves were boxed, and comparison of the candidate segment's boxes 410 of one curve with the boxes of the other gives a set of candidate segment's boxes-pairs that may intersect each other (Step 145)

Figure 5:
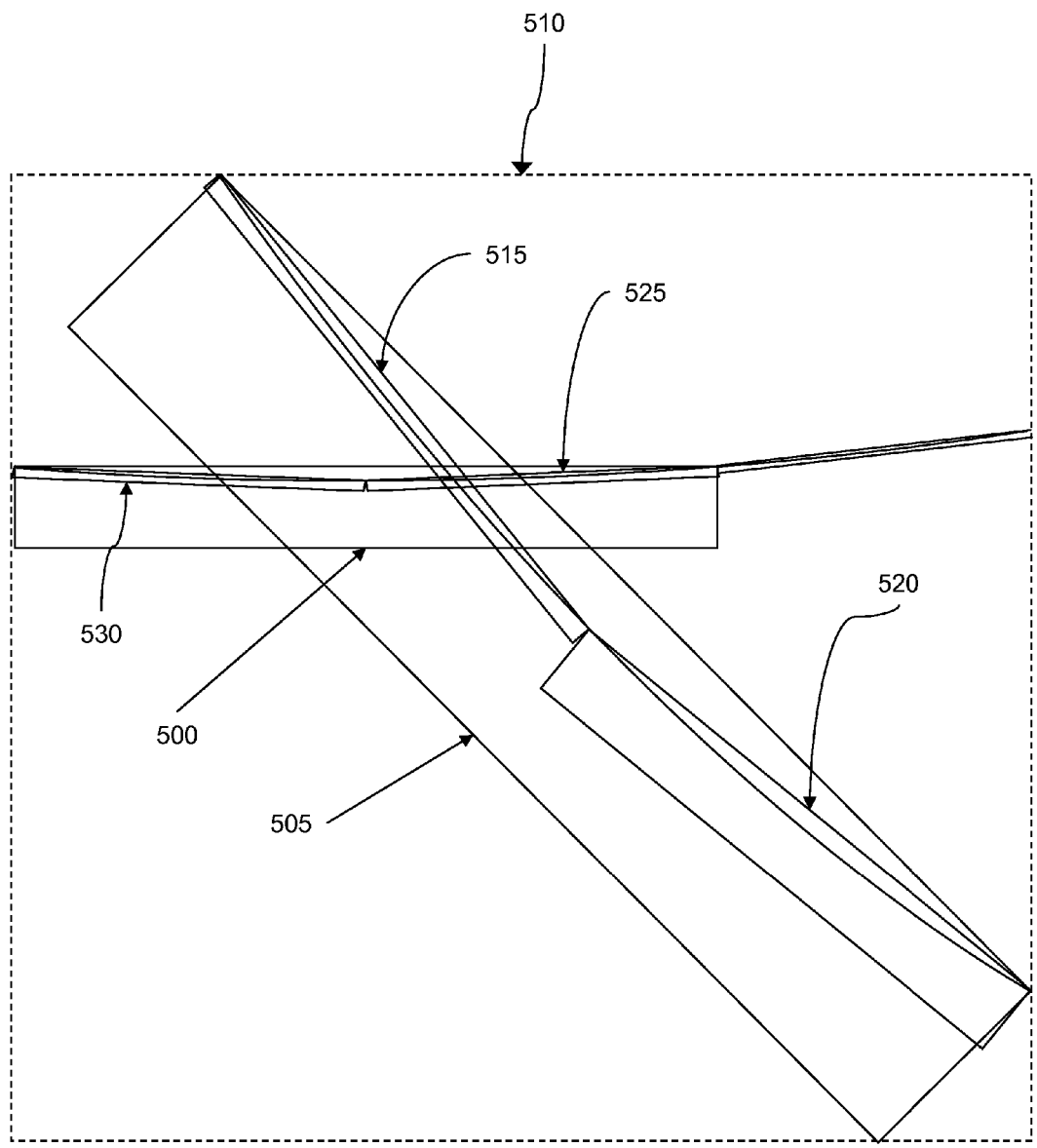
FIG. 5 is an illustration of two candidate segment's boxes that may intersect.

FIG. 5 is an illustration of two candidate segment's boxes that may intersect. Referring further to FIG. 5, so far two candidate segments 500,505 on the parent curves 400,405 have been identified as possibly intersecting, generally shown at 510. The candidate segment's boxes 500,505 are then bisected in Step 150, the recursive subdivision routine, such that each candidate segment's box 500,505 has 2 refined candidate segments for a total of four refined candidate segment's boxes 515,520,525,530 for the pair of candidate segments 500,505 (Step 155). It is understood that Illustrated in FIG. 5 are two refined candidate segments that may intersect and have the derivatives at their respective ends that are sufficiently straight (Step 170).

Figure 6:
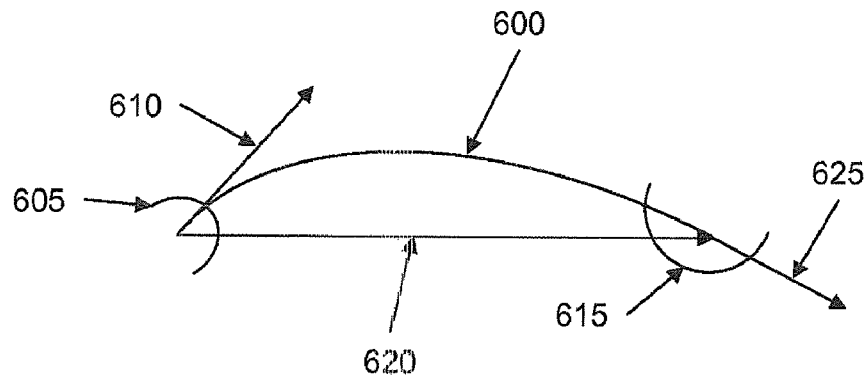
FIG. 6 is an example illustration of a sufficiently straight comparison.

FIG. 6 is an example illustration of a sufficiently straight comparison. Referring further to FIG. 6, the refined candidate segment 600 is "sufficiently straight" when an angle 605 between the derivative of the refined candidate segment first end at 610 and an angle 615 of the segment chord 620, and the angle between the derivative direction 625 and the segment chord 620, are both less than 5 degrees.

Figure 7:
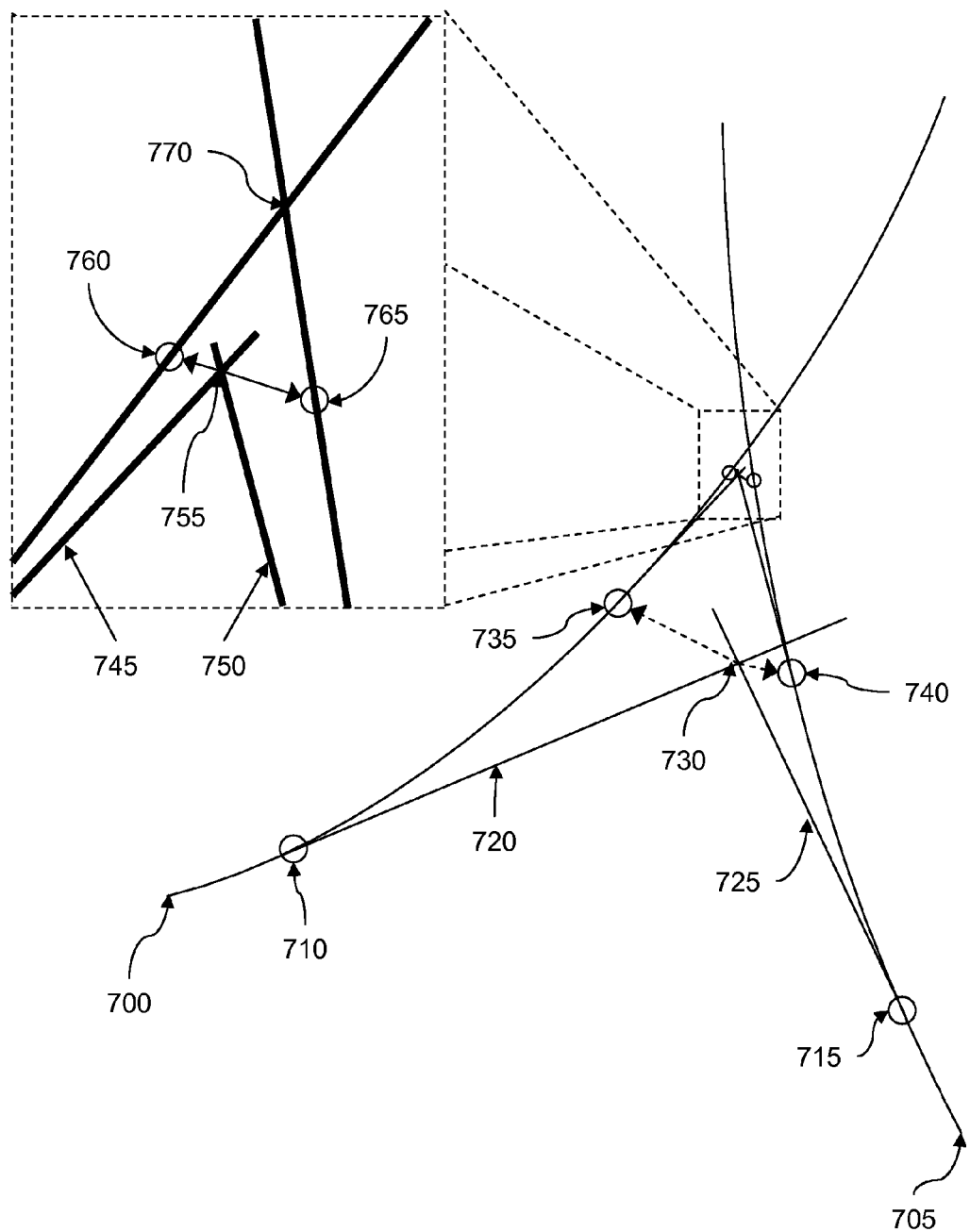
FIG. 7 is an illustration of a pincer intersector technique.

FIG. 7 is an illustration of a pincer intersector technique. Referring further to FIG. 7, a pair of finalized segments 700, 705 have a pair of starting parameter values at 710 and 715, respectively, and have the respective first-order Taylor Approximations calculated that result in a pair of tangent lines 720 and 725, respectively, that intersect at 730. In the pincer process, FIG. 2, in this instance, Step 210 is false and a terminating condition has not occurred at Step 220. The recorded parameter values 735 and 740 are the new starting points for a next iteration of the Taylor Approximation at Step 230 to calculate a next pair of tangent lines 745 and 750 that intersect at 755. The pincer process again queries whether to terminate at Step 220, in this illustration, none of the terminating conditions have been satisfied that then results in a next recorded parameter value pair 760 and 765 at Step 230 respectively, as the new starting point for the next iteration of the Taylor Approximation Step 205. In this third iteration, the pair of first-order Taylor Approximations intersect at 770 and are within a desired linear accuracy (0.000000000000001) to each other thereby causing the pincer process to terminate at Step 225 with a valid high accuracy solution.

Summary

Figure 8:
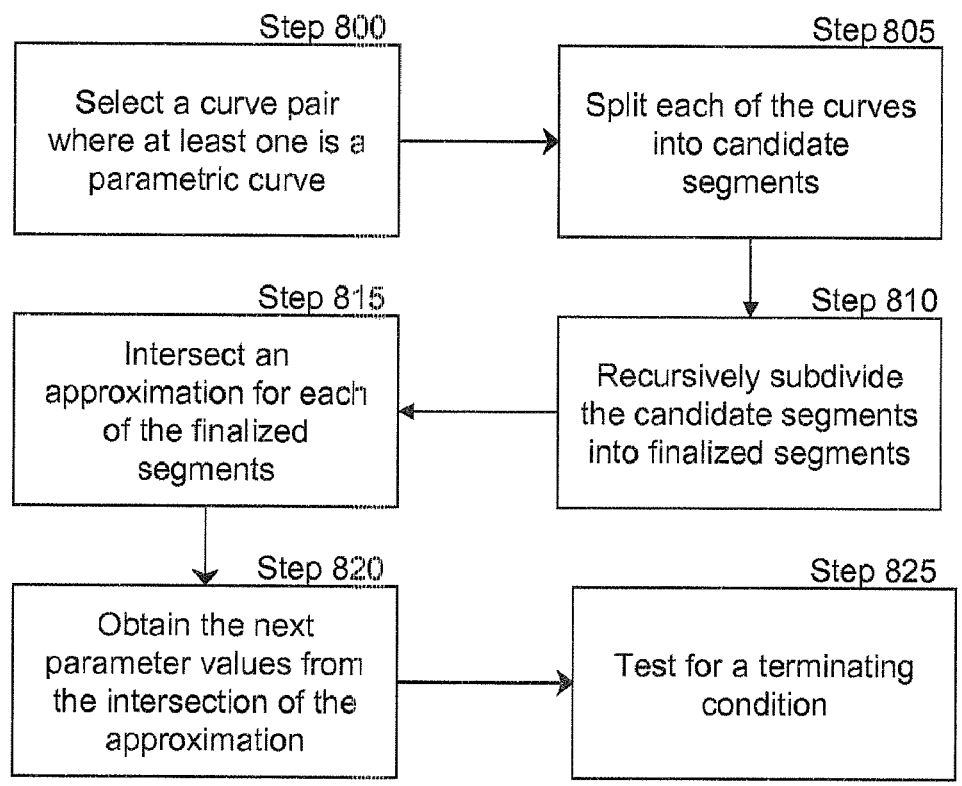
FIG. 8 is a technique to find an intersection for geometrically coincident curves.

Given the process and operation above, FIG. 8 is a technique to find an intersection for geometrically coincident curves. Referring further to FIG. 8, the presently preferred embodiment selects a curve pair where at least one curve in the curve pair is a parametric curve (Step 800). Next, each of the curves are split into a plurality of candidate curve segments (Step 805). Next, recursively subdivide each of the candidate segments until determining a pair of finalized segments that are sufficiently straight (Step 810). Then, intersect an approximation for each of the refined candidate segments (Step 815). From the approximation, iteratively obtain a plurality of next parameter (Step 820) values until terminating (Step 825).

Figure 9:
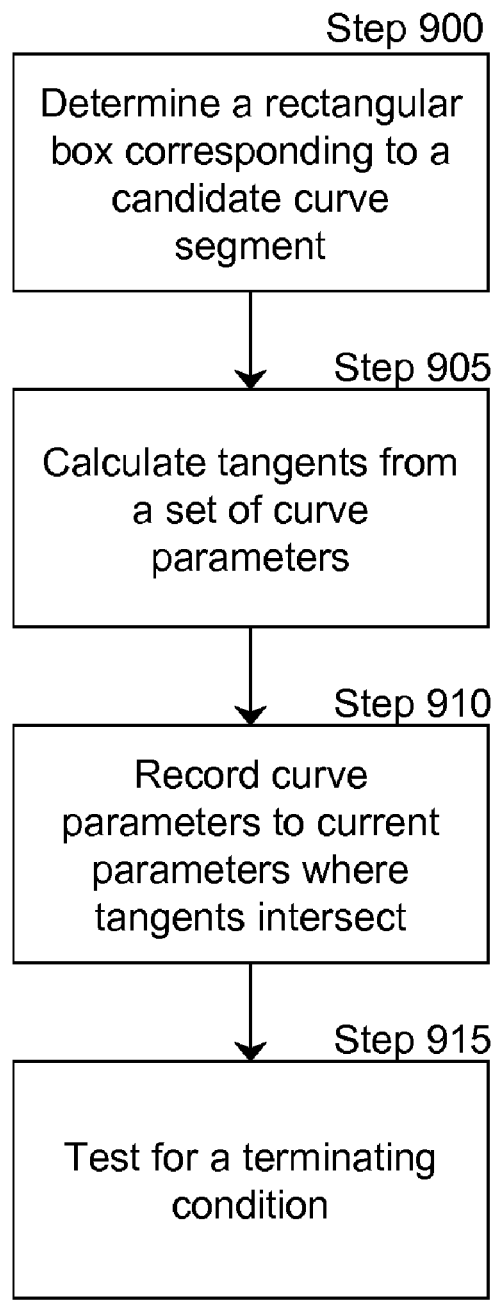
FIG. 9 is a technique to find an intersection for geometrically coincident curves.

To elaborate, FIG. 9 is a technique to find an intersection for geometrically coincident curves. Referring to FIG. 9, determine a rectangular box corresponding to a candidate curve segment having a set of current parameters, wherein said rectangular box completely contains said candidate curve segment (Step 900). Next, calculate a plurality of tangents from said set of current parameters (Step 905). Then record a plurality of parameter values to said current parameters that corresponds to an intersection of said calculated tangents (Step 910). Finally test for a terminating condition (Step 915).

Figure 10:
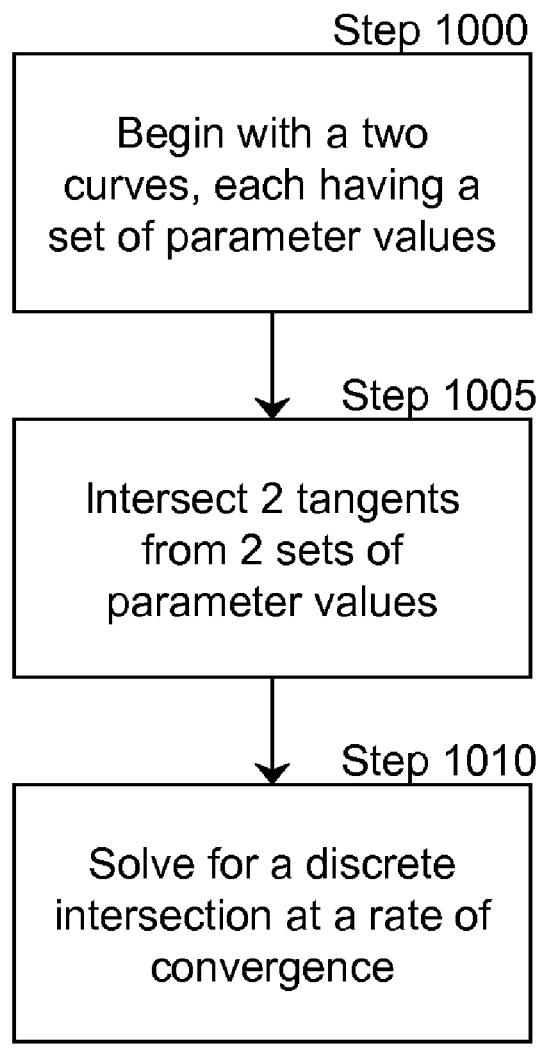
FIG. 10 is a technique to determine an intersection of two curves.

To further elaborate, FIG. 10 is a technique to determine an intersection of two curves. Referring to FIG. 10, the technique starts with a first curve with a set of parameter values, and a second curve with a set of parameter values (Step 1000). Next, intersect two tangents determined from said two sets of parameter values that result in a next pair of parameter values (Step 1005). Finally solve for a discrete intersection of said curves at a rate of convergence (Step 1010) so that the rate of convergence doubles an intersection precision.

Conclusion

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application2-specific integrated circuits).

A number of embodiments have been described. It will be understood that various modifications may be made without departing from the spirit and scope of the presently preferred embodiment such as the use of parabolic curves corresponding to second-order Taylor approximations other similar approximations. Likewise the desired linear accuracy can be varied based on application requirements or standard bodies or project requirements, for example. Further more low curve angle can be varied that is inversely proportional to the candidate segment's boxes, for example, the higher the curve angle, the fewer the candidate segment's boxes. Also sufficiently straight can be modified to correspond to project, coding, or other requirements. And terminating conditions such as the number of iterations can be modified to require more iterations before terminating that would result in a more precise result to an accurate solution within the desired linear accuracy, for example. Therefore, other implementations are within the scope of the following claims.

What is claimed is:

1. A method to find an intersection for geometrically coincident curves, comprising:
   identifying a first rectangular box containing a first segment of a first curve and a second rectangular box containing a second segment of a second curve, the first segment and the second segment having a set of current parameters, wherein said first rectangular box intersects with said second rectangular box;
   calculating a plurality of tangents from said set of current parameters;
   determining, using a processor, whether tangents calculated from the first segment intersect with tangents calculated from the second segment; and
   recording a plurality of parameter values to said current parameters that corresponds to an intersection of said tangents calculated.

2. The method of claim 1, wherein calculating of said plurality of tangents occurs utilizing n-order Taylor series approximations.

3. A method to determine an intersection of two curves, the method performed by a data processing system, comprising:
   identifying a first curve with a first set of parameter values, and a second curve with a second set of parameter values;
   calculating, using the data processing system, a plurality of tangents of the first set of parameter values and the second set of parameter values;
   identifying a tangent calculated from the first set of parameter values that intersects with a tangent calculated from the second set of parameter values to form a pair of intersecting tangents;
   identifying a next pair of parameter values from the pair of intersecting tangents; and
   solving for a discrete intersection of said first curve with said second curve at a rate of convergence using the next pair of parameter values.

4. A data processing system for determining an intersection of two curves, the data processing system comprising:
   a storage device storing program code;
   a processor operably connected to the storage device, wherein the processor is configured to execute the program code to identify a first curve with a first set of parameter values, and a second curve with a second set of parameter values; calculate a plurality of tangents of the first set of parameter values and the second set of parameter values; identify a tangent calculated from the first set of parameter values that intersects with a tangent calculated from the second set of parameter values to form a pair of intersecting tangents; identify a next pair of parameter values from the pair of intersecting tangents; and solve for a discrete intersection of said first curve with said second curve at a rate of convergence using the next pair of parameter values.

5. A computer-program product for determining an intersection of two curves, the computer-program product comprising:
   at least one non-transitory storage device;
   program code, stored on the at least one storage device, to identify a first curve with a first set of parameter values, and a second curve with a second set of parameter values;
   program code, stored on the at least one storage device, to calculate a plurality of tangents of the first set of parameter values and the second set of parameter values;
   program code, stored on the at least one storage device, to identify a tangent calculated from the first set of parameter values that intersects with a tangent calculated from the second set of parameter values to form a pair of intersecting tangents;
   program code, stored on the at least one storage device, to identify a next pair of parameter values from the pair of intersecting tangents; and
   program code, stored on the at least one storage device, to solve for a discrete intersection of said first curve with said second curve at a rate of convergence using the next pair of parameter values.

* * * * *